US011159791B2

(12) United States Patent
Chen et al.

(10) Patent No.: US 11,159,791 B2
(45) Date of Patent: Oct. 26, 2021

(54) METHOD AND APPARATUS FOR SIGNALING ADAPTIVE LOOP FILTER PARAMETERS IN VIDEO CODING

(71) Applicant: MEDIATEK INC., Hsinchu (TW)

(72) Inventors: Ching-Yeh Chen, Hsinchu (TW); Tzu-Der Chuang, Hsinchu (TW); Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/817,707

(22) Filed: Mar. 13, 2020

(65) Prior Publication Data

US 2020/0296365 A1  Sep. 17, 2020

Related U.S. Application Data

(60) Provisional application No. 62/819,583, filed on Mar. 16, 2019.

(51) Int. Cl.
*H04N 19/117* (2014.01)
*H04N 19/182* (2014.01)
*H04N 19/96* (2014.01)

(52) U.S. Cl.
CPC ......... *H04N 19/117* (2014.11); *H04N 19/182* (2014.11); *H04N 19/96* (2014.11)

(58) Field of Classification Search
CPC .............................. H04N 19/117; H04N 19/82
See application file for complete search history.

(56) References Cited

U.S. PATENT DOCUMENTS

| 2013/0156097 A1* | 6/2013 | Budagavi | H04N 19/82 375/240.02 |
| 2013/0266059 A1* | 10/2013 | Chong | H04N 19/169 375/240.02 |
| 2015/0016506 A1* | 1/2015 | Fu | H04N 19/167 375/240.02 |

(Continued)

OTHER PUBLICATIONS

"Adaptive Loop Filtering for Video Coding"—Chia-Yang Tsai, Ching-Yeh Chen, Tomoo Yamakage, In Suk Chong, Yu-Wen Huang, Chih-Ming Fu, Takayuki Itoh, Takashi watanabe, Takeshi Chujoh, Marta Karczewicz, and Shaw-Min Lei; IEEE Journal of Selected Topics in Signal Processing, vol. 7, No. 6, Dec. 2013 (Year: 2013).*

(Continued)

*Primary Examiner* — Mainul Hasan
(74) *Attorney, Agent, or Firm* — Oblon, McClelland, Maier & Neustadt, L.L.P.

(57) ABSTRACT

According to a method for Adaptive Loop Filter (ALF) processing of reconstructed video, multiple indicators are signaled in slice at an encoder side or parsed at a decoder side, where the multiple indicators are Adaptive Parameter Set (APS) indices associated with temporal ALF filter sets for the ALF processing. A current indicator is determined from the multiple indicators, where the current indicator is used to select a current ALF filter set. Filtered-reconstructed pixels are derived for the current block by applying the current ALF filter to the current block. In another method, if the ALF processing applied at a target sample requires an outside sample on other side of a target virtual boundary from the target sample, the outside sample is replaced by a padded sample.

6 Claims, 5 Drawing Sheets

(56) References Cited

U.S. PATENT DOCUMENTS

| | | | |
|---|---|---|---|
| 2016/0234492 A1* | 8/2016 | Li | H04N 19/70 |
| 2017/0195670 A1* | 7/2017 | Budagavi | H04N 19/172 |
| 2017/0332075 A1* | 11/2017 | Karczewicz | H04N 19/107 |
| 2018/0041779 A1* | 2/2018 | Zhang | H04N 19/17 |
| 2019/0238845 A1* | 8/2019 | Zhang | H04N 19/157 |
| 2019/0306502 A1* | 10/2019 | Gadde | H04N 19/132 |
| 2019/0373258 A1* | 12/2019 | Karczewicz | H04N 19/154 |
| 2020/0186798 A1* | 6/2020 | Shlyakhov | H04N 19/174 |
| 2020/0204801 A1* | 6/2020 | Hu | H04N 19/423 |
| 2020/0260120 A1* | 8/2020 | Hanhart | H04N 19/82 |
| 2020/0322632 A1* | 10/2020 | Hanhart | H04N 19/85 |

OTHER PUBLICATIONS

"Geometry Transformation-based Adaptive In-Loop Filter"—Marta Karczewicz, Li Zhang, Wei-Jung Chien, Xiang Li; 2016 Picture Coding Symposium (PCS); Dec. 4-7, 2016 (Year: 2016).*

* cited by examiner

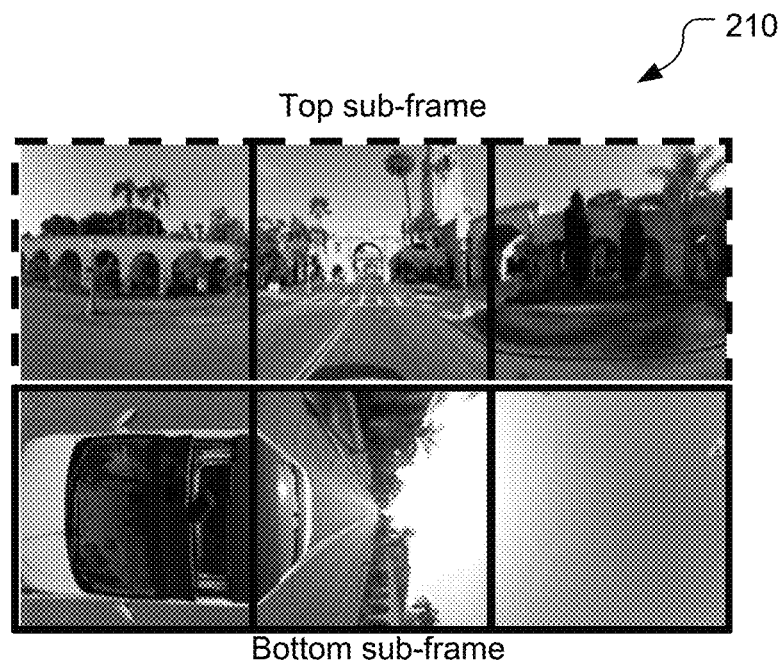
Fig. 2 *(prior art)*
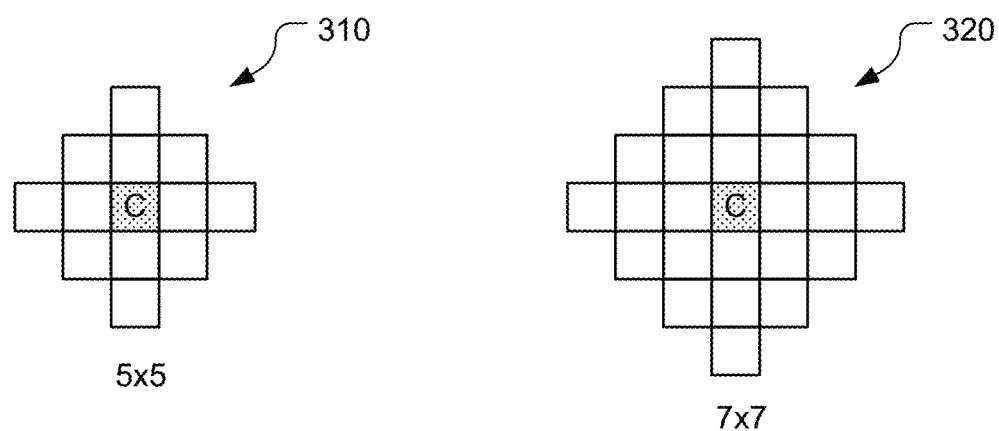
Fig. 3

METHOD AND APPARATUS FOR SIGNALING ADAPTIVE LOOP FILTER PARAMETERS IN VIDEO CODING

CROSS REFERENCE TO RELATED APPLICATIONS

The present invention claims priority to U.S. Provisional Patent Application Ser. No. 62/819,583, filed Mar. 16, 2019. The U.S. Provisional Patent Application is hereby incorporated by reference in its entirety.

FIELD OF THE INVENTION

The present invention relates to adaptive loop filter (ALF) signaling and processing in a video coding system. In particular, the present invention relates to ALF signaling using Adaptive Parameter Set (APS) in a video encoder or decoder and ALF processing across discontinuous boundaries.

BACKGROUND

Motion estimation is an effective inter-frame coding technique to exploit temporal redundancy in video sequences. Motion-compensated inter-frame coding has been widely used in various international video coding standards The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate a compressed video bitstream. During the encoding process, coding artefacts are introduced, particularly in the quantization process. In order to alleviate the coding artefacts, additional processing has been applied to reconstructed video to enhance picture quality in newer coding systems. The additional processing is often configured in an in-loop operation so that the encoder and decoder may derive the same reference pictures to achieve improved system performance.

FIG. 1A illustrates an exemplary adaptive Inter/Intra video coding system incorporating in-loop processing. For inter-prediction, Motion Estimation (ME)/Motion Compensation (MC) 112 is used to provide prediction data based on video data from other picture or pictures. Switch 114 selects Intra Prediction 110 or inter-prediction data and the selected prediction data is supplied to Adder 116 to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 122 as shown in FIG. 1A. When an inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In the High Efficiency Video Coding (HEVC) standard being developed, Deblocking Filter (DF) 130, Sample Adaptive Offset (SAO) 131 and Adaptive Loop Filter (ALF) 132 have been developed to enhance picture quality. The in-loop filter information may have to be incorporated in the bitstream so that a decoder can properly recover the required information. Therefore, in-loop filter information from SAO and ALF is provided to Entropy Encoder 122 for incorporation into the bitstream. In FIG. 1A, DF 130 is applied to the reconstructed video first; SAO 131 is then applied to DF-processed video; and ALF 132 is applied to SAO-processed video. However, the processing order among DF, SAO and ALF can be re-arranged.

A corresponding decoder for the encoder of FIG. 1A is shown in FIG. 1B. The video bitstream is decoded by Video Decoder 142 to recover the transformed and quantized residues, SAO/ALF information and other system information. At the decoder side, only Motion Compensation (MC) 113 is performed instead of ME/MC. The decoding process is similar to the reconstruction loop at the encoder side. The recovered transformed and quantized residues, SAO/ALF information and other system information are used to reconstruct the video data. The reconstructed video is further processed by DF 130, SAO 131 and ALF 132 to produce the final enhanced decoded video.

The coding process in HEVC is applied according to Largest Coding Unit (LCU). The LCU is adaptively partitioned into coding units using quadtree. In each leaf CU, DF is performed for each 8×8 block and in HEVC Test Model Version 4.0 (HM-4.0), the DF is applies to 8×8 block boundaries. For each 8×8 block, horizontal filtering across vertical block boundaries is first applied, and then vertical filtering across horizontal block boundaries is applied. During processing of a luma block boundary, four pixels of each side are involved in filter parameter derivation, and up to three pixels on each side can be changed after filtering. For horizontal filtering across vertical block boundaries, unfiltered reconstructed pixels (i.e., pre-DF pixels) are used for filter parameter derivation and also used as source pixels for filtering. For vertical filtering across horizontal block boundaries, unfiltered reconstructed pixels (i.e., pre-DF pixels) are used for filter parameter derivation, and DF intermediate pixels (i.e. pixels after horizontal filtering) are used for filtering. For DF processing of a chroma block boundary, two pixels of each side are involved in filter parameter derivation, and at most one pixel on each side is changed after filtering. For horizontal filtering across vertical block boundaries, unfiltered reconstructed pixels are used for filter parameter derivation and are used as source pixels for filtering. For vertical filtering across horizontal block boundaries, DF processed intermediate pixels (i.e. pixels after horizontal filtering) are used for filter parameter derivation and also used as source pixel for filtering.

Sample Adaptive Offset (SAO) 131 is also adopted in HM-4.0, as shown in FIG. 1A. SAO can be regarded as a special case of filtering where the processing only applies to one pixel. In SAO, pixel classification is first done to classify pixels into different groups (also called categories or classes). The pixel classification for each pixel is based on a 3×3 window. Upon the classification of all pixels in a picture or a region, one offset is derived and transmitted for each group of pixels. ALF is not adopted by the HEVC (High Efficiency Video Coding). However, ALF is being considered for the emerging video coding standard, names VVC (Versatile Video Coding). The filter coefficients of ALF are derived by minimizing the sum of the distortion between filtered samples and original samples. Furthermore, the derived filter coefficients are signaled in the bitstream with on/off control flags. Multiple filters can be used in one slice and the filter selection includes implicit selection by block-based classification and explicit selection by signaled syntax.

The coding tree block (CTB) based ALF scheme was proposed in JVET-K0382 (M. Karczewicz, et al., "*CE2-related: CTU Based Adaptive Loop Filtering*", Joint Video Exploration Team (JVET) of ITU-T SG 16 WP 3 and ISO/IEC JTC 1/SC 29/WG 11, 11th Meeting: Ljubljana, SI, 10-18 Jul. 2018, Document: JVET-K0382), JVET-L0391 (N. Hu, et al., "*CE2.3 and CE2.4: Fixed filters, temporal filters, CU-level control and low-latency encoder for ALF*", Joint Video Exploration Team (JVET) of ITU-T SG 16 WP 3 and ISO/IEC JTC 1/SC 29/WG 11, 12th Meeting: Macao, CN, 3-12 Oct. 2018, Document: JVET-L0391) and JVET-M0429 (N. Hu, et al., "*Coding tree block based adaptive loop filter*", Joint Video Exploration Team (JVET) of ITU-T SG 16 WP 3 and ISO/IEC JTC 1/SC 29/WG 11, 13th Meeting: Marrakech, MA, 9-18 Jan. 2019, Document: JVET-M0429). According to CTU (coding tree unit) or CTB based ALF, an ALF filter set is selected and applied to all blocks in a CTU or CTB. Each slice contains at most one new set of signaled ALF filters and this filter set can be further reused in the following slices to reduce the overhead. The signalled ALF filter sets are stored and updated as a first-in-first-out (FIFO) buffer and named as temporal filter sets. In CTB based ALF, for luma component, when ALF is applied to a luma CTB, the choice among 5 temporal or 1 signaled filter sets is indicated. If one of temporal filter sets is selected, only the corresponding FIFO index is signaled. For chroma component, when ALF is applied to a chroma CTB, if a new filter is signaled for a slice, the CTB uses the new filter; otherwise, the most recent temporal chroma filter satisfying the temporal scalability constraint in the FIFO is applied. After Adaptive parameter set (APS) was adopted in VTM4 (VVC Test Model 4), ALF filters are signalled in APS instead of slice. For the slice-level temporal filter, the APSs are updated as a first-in-first-out (FIFO) buffer.

The 360-degree video, also known as immersive video is an emerging technology, which can provide "feeling as sensation of present". The sense of immersion is achieved by surrounding a user with wrap-around scene covering a panoramic view, in particular, 360-degree field of view. The "feeling as sensation of present" can be further improved by stereographic rendering. Accordingly, the panoramic video is being widely used in Virtual Reality (VR) applications.

The 360-degree virtual reality (VR) pictures may be captured using a 360-degree spherical panoramic camera or multiple pictures arranged to cover all field of views around 360 degrees. The three-dimensional (3D) spherical picture is difficult to process or store using the conventional picture/video processing devices. Therefore, the 360-degree VR pictures are often converted to a two-dimensional (2D) format using a 3D-to-2D projection method, such as EquiRectangular Projection (ERP) and CubeMap Projection (CMP). Besides the ERP and CMP projection formats, there are various other VR projection formats, such as OctaHedron Projection (OHP), icosahedron projection (ISP), Segmented Sphere Projection (SSP) and Rotated Sphere Projection (RSP) that are widely used in the field.

For a 360° video, the layout for a specific projection format may have one or more discontinuous edges. Applying the in-loop filters on these discontinuous edges directly may result in poor visual quality and decreased coding efficiency because the accessed pixels (to be referenced and/or filtered) across discontinuous edges are jointly processed (filtered). For projection formats composed of a plurality of faces, no matter what kind of compact frame packing arrangement is used, discontinuities appear between two or more adjacent faces in the frame packed picture. For example, considering the 3×2 frame packing configuration 210 depicted in FIG. 2, the three faces in the top half are continuous in the 3D geometry, the three faces in the bottom half are continuous in the 3D geometry. However, the top and bottom halves of the frame packed picture 210 are discontinuous in the 3D geometry. If in-loop filtering operations are performed across this discontinuity, face seam artifacts may become visible in the reconstructed video.

BRIEF SUMMARY OF THE INVENTION

A method and apparatus for Adaptive Loop Filter (ALF) processing of reconstructed video are disclosed. According to this method, reconstructed pixels are received, where the reconstructed pixels comprise a current block. ALF filters are received, where ALF filters are signaled in Adaptive Parameter Set (APS) and each ALF APS has one APS index. Multiple indicators are signaled in slice at an encoder side or parsed at a decoder side, where the multiple indicators are ALF APS indices associated with ALF filter sets for the ALF processing. A current indicator is determined from the multiple indicators, where the current indicator is used to select a current ALF filter set. Filtered-reconstructed pixels are derived for the current block by applying the current ALF filter set to the current block. The filtered-reconstructed pixels are provided.

In one embodiment, the multiple ALF APS indices are signaled in a tile group level. In another embodiment, the multiple ALF APS indices are signaled in a slice level. In yet another embodiment, the multiple ALF APS indices are signaled in a Coding Tree Block (CTB) level. A selected ALF filter set indicated by a current indicator can be applied to all blocks in a Coding Tree Block (CTB). Furthermore, a new ALF filter set is allowed to be switched at a CTB level.

According to another method, one or more virtual boundaries in the current picture are determined. Filtered-reconstructed pixels are derived for the current picture by applying the ALF processing to the current picture, where if the ALF processing applied at a target sample requires an outside sample across a target virtual boundary, the outside sample is replaced by a padded sample. The filtered-reconstructed pixels are provided.

In one embodiment, said one or more virtual boundaries in the current picture correspond to one or more discontinuous boundaries in target picture of a 360 video. In another embodiment, said one or more virtual boundaries in the current picture correspond to one or more discontinuous boundaries in a target picture comprising a sub-picture within a main picture. In yet another embodiment, information regarding said one or more virtual boundaries in the current picture is signaled at an encoder side or parsed at a decoder side. The target virtual boundary may correspond to a vertical or a horizontal boundary.

BRIEF DESCRIPTION OF THE DRAWINGS

FIG. 2 illustrates an example of 4×3 and 3×2 cubemap layout formations.

FIG. 3 illustrates an example of the ALF comprising a 5×5 filter and a 7×7 filter, where "C" indicates a current reconstructed pixel being filtered.

DETAILED DESCRIPTION OF THE INVENTION

Figure 1A:
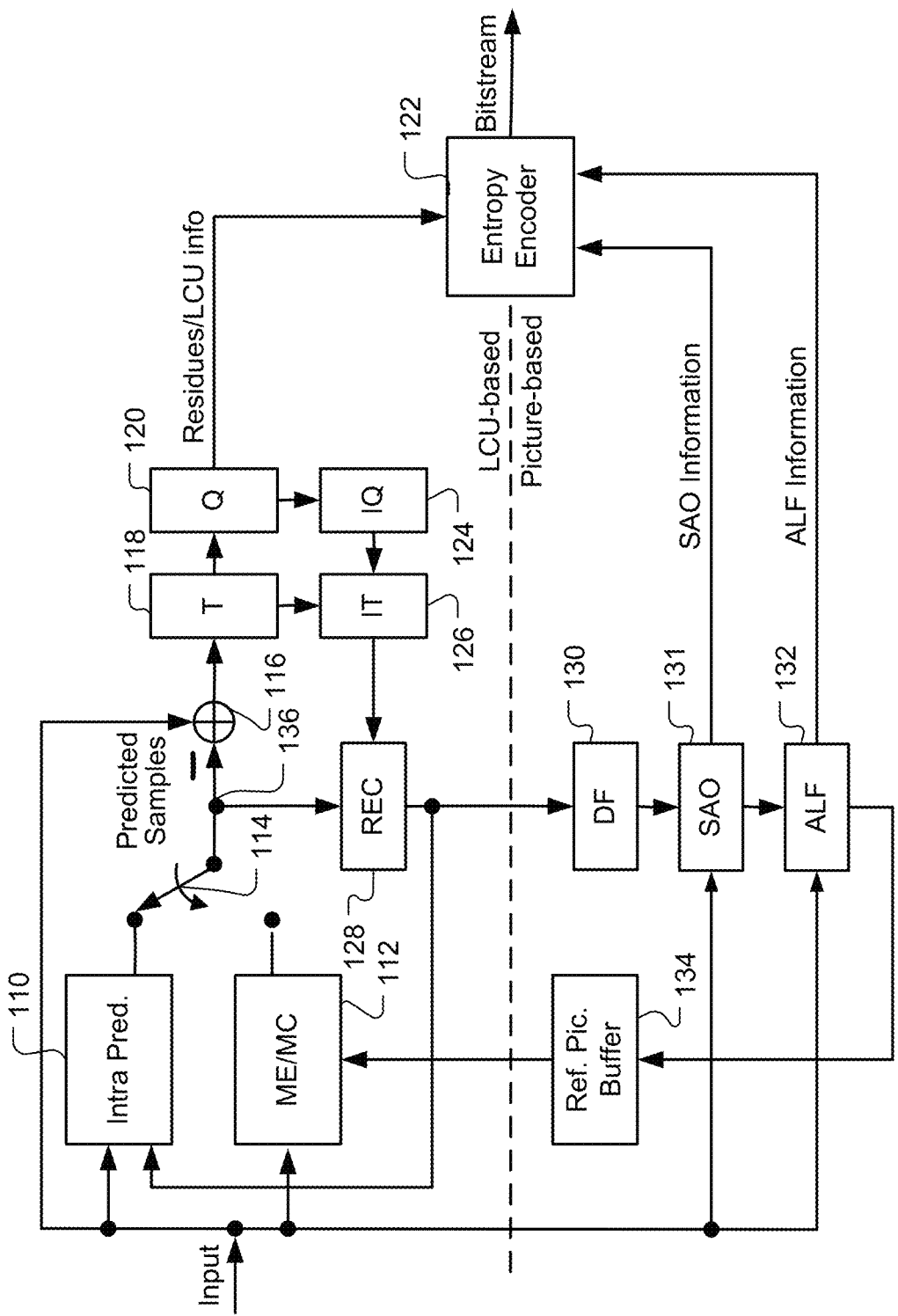
FIG. 1A illustrates an exemplary adaptive inter/intra video encoding system incorporating DF, SAO and ALF in-loop processing.
Figure 1B:
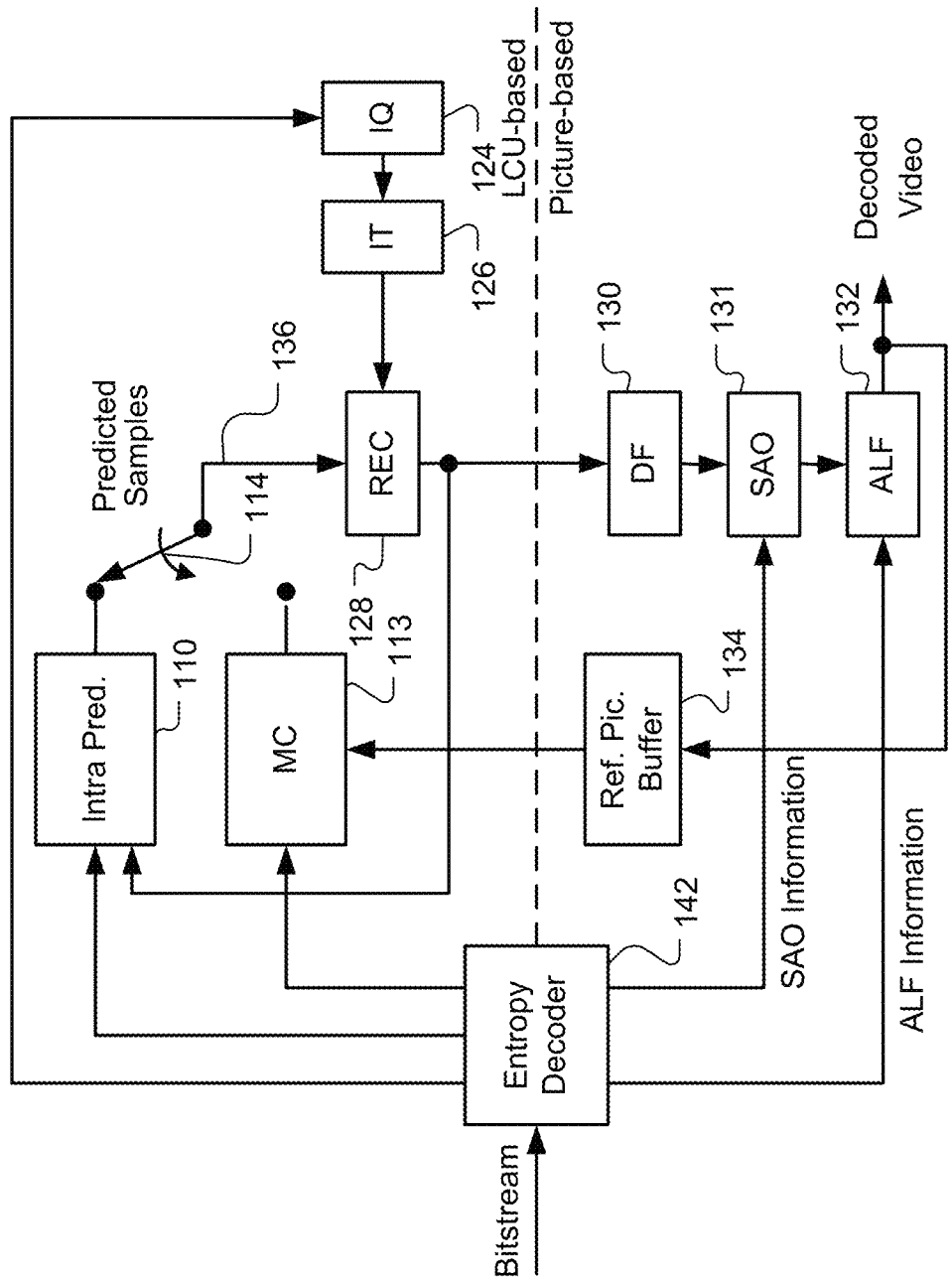
FIG. 1B illustrates an exemplary adaptive inter/intra video decoding system incorporating DF, SAO and ALF in-loop processing.

The following description is of the best-contemplated mode of carrying out the invention. This description is made for the purpose of illustrating the general principles of the invention and should not be taken in a limiting sense. The scope of the invention is best determined by reference to the appended claims.

In JVET-N0438 (S-Y Lin, et al., "*AHG12: Loop filter disabled across virtual boundaries*", in Joint Video Exploration Team (JVET) of ITU-T SG 16 WP 3 and ISO/IEC JTC 1/SC 29/WG 11, 14th Meeting: Geneva, CH, 19-27 Mar. 2019, Document: JVET-N0438), proposed method is disclosed to disable the in-loop filters across vertical and/or horizontal virtual boundaries in the picture. In JVET-N0088 (C-Y Chen, et al., "*CE5-1: Adaptive loop filter with virtual boundary processing*", in Joint Video Exploration Team (WET) of ITU-T SG 16 WP 3 and ISO/IEC JTC 1/SC 29/WG 11, 14th Meeting: Geneva, CH, 19-27 Mar. 2019, Document: JVET-N0088), a technique for ALF with virtual boundaries (VBs) is disclosed to remove the required line buffer of adaptive loop filter (ALF). In ALF of VTM4.0, seven luma line buffers and four chroma line buffers are required because of using 7×7 diamond filters with 4×4 block-based classification for luma component and 5×5 diamond filter for chroma component. The footprint for the 5×5 and 7×7 diamond filters (310 and 320) are shown in FIG. 3. In order to fully remove the line buffer requirement, ALF with virtual boundary (VB) processing is disclosed as follows: when a sample located at one side of a VB is filtered, accessing samples located at the other side of the VB is forbidden. The originally required samples at the other side of the VB are replaced with padded samples.

In the present invention, techniques for ALF signaling and ALF processing across virtual boundaries of 360 videos or pictures with sub-picture are disclosed.

Method 1: ALF Signaling

In JVET-M0429, the selected temporal filter is signaled by using the index in APS FIFO. This will restrict the possibility or the combination of using the coded APS for the current slice (tile group). Furthermore, it may introduce error propagation when APS is missing or sent in duplication. In order to avoid these issues, using the APS index (APS ID) in APS instead of using the index in APS FIFO to indicate the selection of temporal filters for ALF is disclosed in one embodiment. In another embodiment, signaling the selection of temporal filters for ALF using APS ID can be used for CTB-based ALF. When multiple temporal filters are allowed and switched at some level (e.g. CTB level), the APS IDs of temporal filters used in the current slice (tile group) are signaled according to one embodiment of the present invention.

Method 2: ALF Processing Across Virtual Boundaries of 360 Videos

In JVET-N0088, ALF processing using virtual boundaries is proposed to avoid using the samples across the virtual boundaries in order to reduce the line buffer usage. In JVET-M0438, information regarding the discontinuous edges due to different faces in 360 videos are signaled, and the in-loop filtering process can be disabled at these edges to avoid using uncorrelated samples to do filtering. In JVET-M0438, a control flag (i.e., pps_loop_filter_across_virtual_boundaries_disabled_flag) is signaled. If the flag indicates ALF is disabled across the virtual boundary, the number of virtual boundaries as well as the positions are signaled. In the present invention, a technique is disclosed to treat these discontinuous edges as virtual boundaries for ALF processing with VB process, instead of disabling in-loop filtering process for ALF with VB process. In other words, in-loop filtering is still applied to those samples near the discontinuous edges instead of disabling the in-loop filtering for these samples according to one embodiment of the present invention. However, the virtual boundaries process as disclosed in JVET-N0088 is enabled according to one embodiment of the present invention to avoid using uncorrelated samples at the other side of virtual boundary for the in-loop filtering process.

In one example, when the ALF processing is applied at a target sample position and the footprint of the ALF filter crosses a discontinuous boundary of the picture, and the samples on the other side of the discontinuous boundary are padded. Any padding technique, such as extending a boundary pixel value, can be used. The samples on the other side of the discontinuous boundary are referred as outside samples in this disclosure. The virtual boundaries process proposed in JVET-N0088 is extended to the column directions according to one embodiment of the present invention. In some cases, there are some subpictures in one high resolution video. According to one embodiment of the present invention, the subpicture boundaries can be treated as virtual boundaries and virtual boundaries process as disclosed in JVET-N0088 is applied to those samples near these boundaries.

Any of the foregoing proposed methods can be implemented in encoders and/or decoders. For example, any of the proposed methods can be implemented in an in-loop filtering module of an encoder and/or a decoder. Alternatively, any of the proposed methods can be implemented as a circuit coupled to in-loop filtering module of the encoder and/or the decoder.

Figure 4:
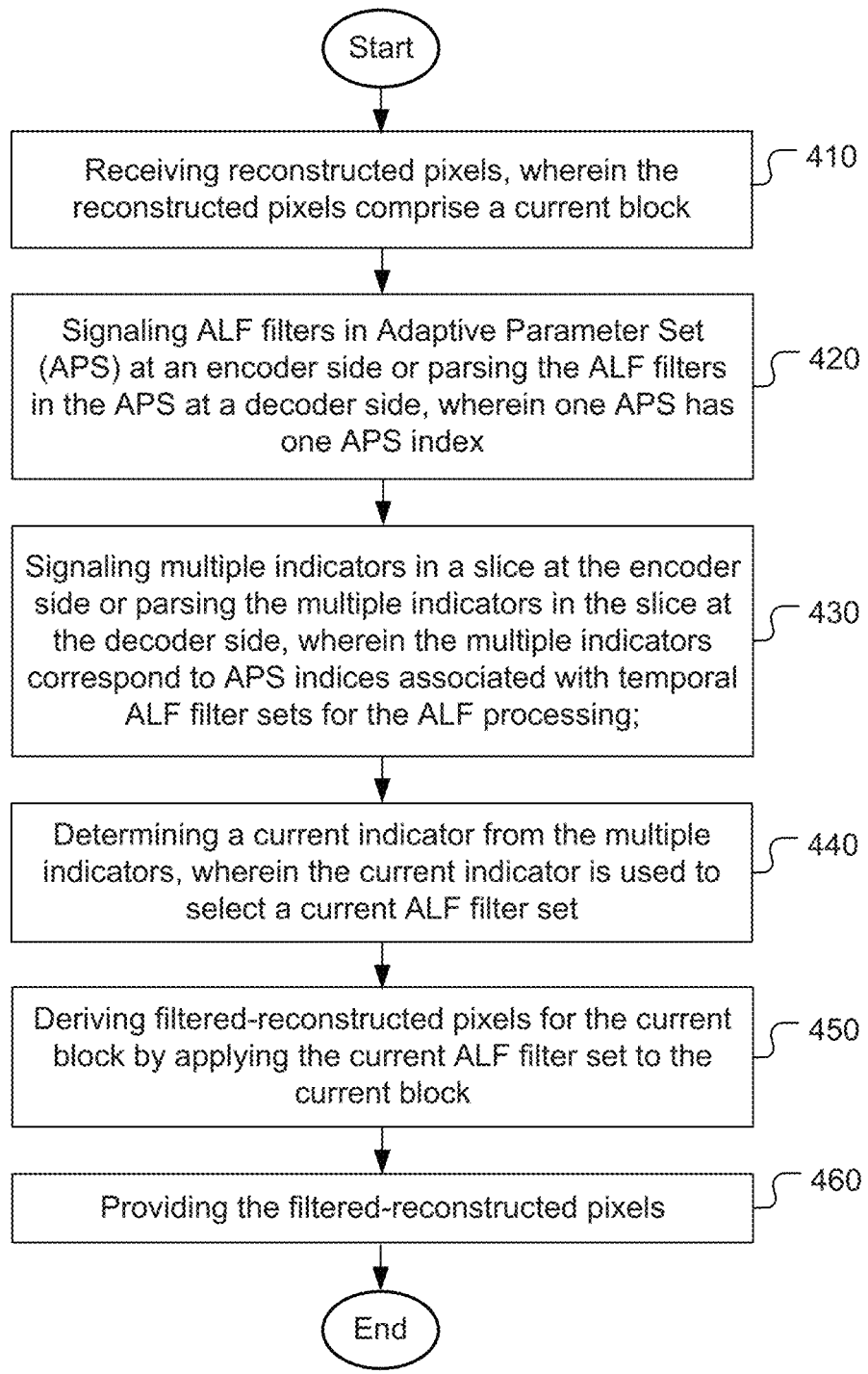
FIG. 4 illustrates a flowchart of an exemplary ALF processing of reconstructed video according to an embodiment of the present invention, where ALF filters are signaled in Adaptive Parameter Set (APS) and multiple ALF APS indices are signaled in slice.

FIG. 4 illustrates a flowchart of an exemplary ALF processing of reconstructed video according to an embodiment of the present invention, where ALF filters are signaled in Adaptive Parameter Set (APS) and multiple APS indices are signaled in slice. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, reconstructed pixels are received in step 410, wherein the reconstructed pixels comprise a current block. ALF filters are signaled in Adaptive Parameter Set (APS) at an encoder side or parsed at a decoder side in step 420, wherein one APS has one APS index. Multiple indicators are signaled in a slice at an encoder side or parsed at a decoder side in step 430, wherein the multiple indicators are ALF APS indices associated with temporal ALF filter sets for the ALF processing. A current indicator is determined from the multiple indicators in step 440, wherein the current indicator is used to select a current ALF filter set. Filtered-reconstructed pixels are derived for the current block by applying the current ALF filter set to the current block in step 450. The filtered-reconstructed pixels are provided in step 460.

Figure 5:
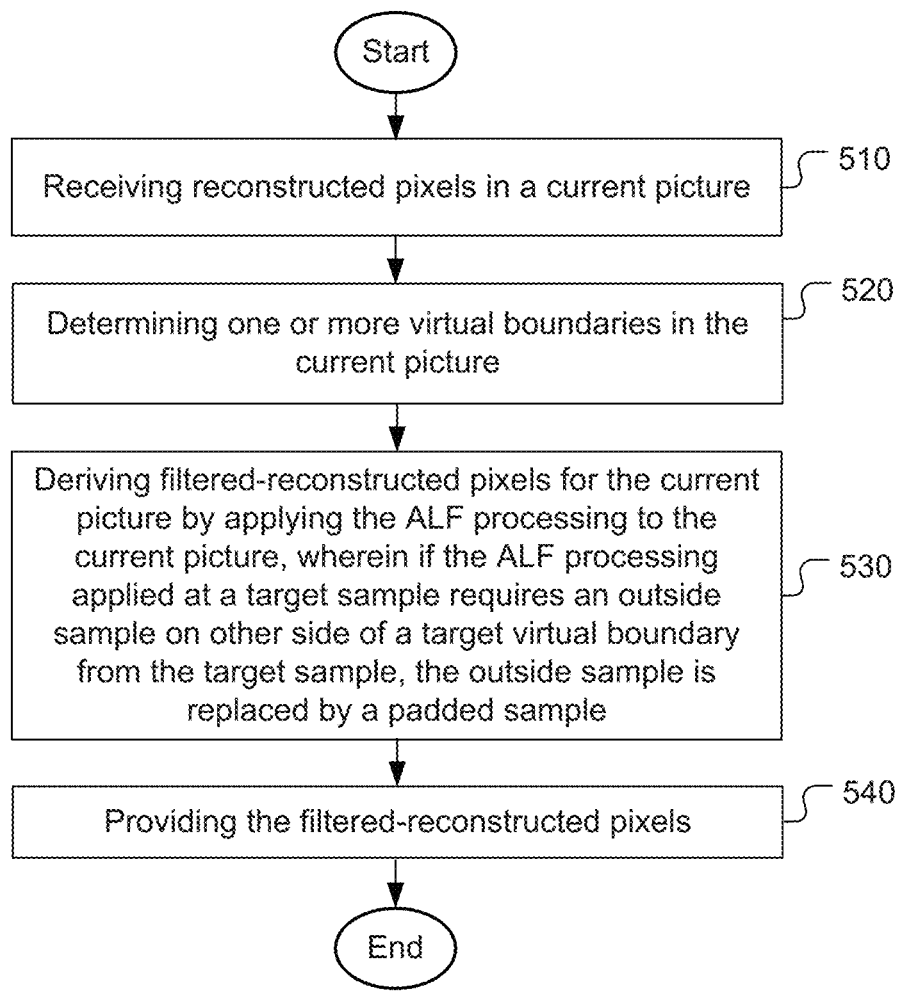
FIG. 5 illustrates a flowchart of an exemplary ALF processing of reconstructed video according to an embodiment of the present invention, where if the ALF processing applied at a target sample requires an outside sample on other side of a target virtual boundary from the target sample, the outside sample is replaced by a padded sample.

FIG. 5 illustrates a flowchart of an exemplary ALF processing of reconstructed video according to an embodiment of the present invention, where if the ALF processing applied at a target sample requires an outside sample on other side of a target virtual boundary from the target sample, the outside sample is replaced by a padded sample. According to this method, reconstructed pixels in a current picture are received in step 510. One or more virtual boundaries in the current picture are determined in step 520. Filtered-reconstructed pixels are derived for the current picture by applying the ALF processing to the current picture in step 530, wherein if the ALF processing applied at a target sample requires an outside sample on other side of a target virtual boundary from the target sample, the outside sample is replaced by a padded sample. The filtered-reconstructed pixels are provided in step 540.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for Adaptive Loop Filter (ALF) processing of reconstructed video, the method comprising:
receiving reconstructed pixels, wherein the reconstructed pixels comprise a current block included in a current Coding Tree Block (CTB) in a slice;
signaling ALF filter sets in respective Adaptive Parameter Sets (APS's) at an encoder side or parsing the ALF filter sets in the respective APS's at a decoder side, wherein each APS has a corresponding APS index;
signaling multiple indicators in the slice at the encoder side or parsing the multiple indicators in the slice at the decoder side, wherein the multiple indicators correspond to APS indices of a subset of the APS's, corresponding ALF filter sets of the subset of the APS's being used as temporal ALF filter sets for the slice, and the corresponding ALF filter sets of the subset of the APS's being selectable and switchable at a CTB level of the slice;
identifying a current ALF filter set for the current CTB from the corresponding ALF filter sets of the subset of the APS's;
deriving filtered-reconstructed pixels for the current block by applying the current ALF filter set to the current block; and
providing the filtered-reconstructed pixels for encoding or decoding of the current block.

2. The method of claim 1, wherein the multiple indicators are signaled in a tile group level.

3. The method of claim 1, wherein the current ALF filter set for the current CTB is identified according to selection information signaled in the current CTB.

4. The method of claim 1, wherein the current ALF filter set is applied to all blocks in the current CTB.

5. An apparatus for Adaptive Loop Filter (ALF) processing of reconstructed video, the apparatus comprising one or more electronic circuits or processors arranged to:

receive reconstructed pixels, wherein the reconstructed pixels comprise a current block included in a current Coding Tree Block (CTB) in a slice;

signal ALF filter sets in respective Adaptive Parameter Sets (APS's) at an encoder side or parsing the ALF filter sets in the respective APS's at a decoder side, wherein each APS has a corresponding APS index;

signal multiple indicators in the slice at the encoder side or parsing the multiple indicators in the slice at the decoder side, wherein the multiple indicators correspond to APS indices of a subset of the APS's, corresponding ALF filter sets of the subset of the APS's being used as temporal ALF filter sets for the slice, and the corresponding ALF filter sets of the subset of the APS's being selectable and switchable at a CTB level of the slice;

identify a current ALF filter set for the current CTB from the corresponding ALF filter sets of the subset of the APS's;

derive filtered-reconstructed pixels for the current block by applying the current ALF filter set to the current block; and provide the filtered-reconstructed pixels for encoding or decoding of the current block.

6. The apparatus of claim 5, wherein the current ALF filter set for the current CTB is identified according to selection information signaled in the current CTB.

\* \* \* \* \*